United States Patent
Schenk

(10) Patent No.: US 11,681,764 B2
(45) Date of Patent: *Jun. 20, 2023

(54) SYSTEM AND METHOD FOR MONITORING INTERNET ACTIVITY

(71) Applicant: Lead Stories LLC, Colorado, CO (US)

(72) Inventor: Maarten Schenk, Houthalen (BE)

(73) Assignee: LEAD STORIES, LLC, Colorado Springs, CO (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/915,702

(22) Filed: Jun. 29, 2020

(65) Prior Publication Data
US 2020/0327177 A1 Oct. 15, 2020

Related U.S. Application Data

(63) Continuation of application No. 15/164,954, filed on May 26, 2016, now Pat. No. 10,698,963.

(60) Provisional application No. 62/230,091, filed on May 26, 2015.

(51) Int. Cl.
*G06F 16/20* (2019.01)
*G06F 16/9535* (2019.01)

(52) U.S. Cl.
CPC ................. *G06F 16/9535* (2019.01)

(58) Field of Classification Search
None
See application file for complete search history.

(56) References Cited

U.S. PATENT DOCUMENTS

| | | | |
|---|---|---|---|
| 7,428,522 B1 | 9/2008 | Raghunathan | |
| 8,909,652 B2 | 12/2014 | Govani et al. | |
| 9,762,629 B1 * | 9/2017 | Bhargava | H04L 65/40 |
| 10,311,362 B1 * | 6/2019 | Mirza | G06N 5/04 |
| 2012/0271719 A1 * | 10/2012 | Straley | G06Q 30/02 |
| | | | 705/14.66 |
| 2015/0169587 A1 * | 6/2015 | Silverman | G06F 16/24578 |
| | | | 707/751 |
| 2016/0055164 A1 * | 2/2016 | Cantarero | G06F 16/447 |
| | | | 707/740 |

* cited by examiner

*Primary Examiner* — Tarek Chbouki
*Assistant Examiner* — Loan T Nguyen
(74) *Attorney, Agent, or Firm* — Procopio, Cory, Hargreaves & Savitch LLP

(57) ABSTRACT

A system and method for determining social media trending activity of content on the internet is disclosed. The method may include establishing source(s) of internet content, detecting measurements of social media activity for the content in the sources, aggregating the measurements, storing the aggregated measurements in a database over a range of time, calculating a rate of change of the aggregated measurements over the range of time, and comparing the calculated rate of change with the aggregated measurement to obtain a trending value for the content.

19 Claims, 16 Drawing Sheets

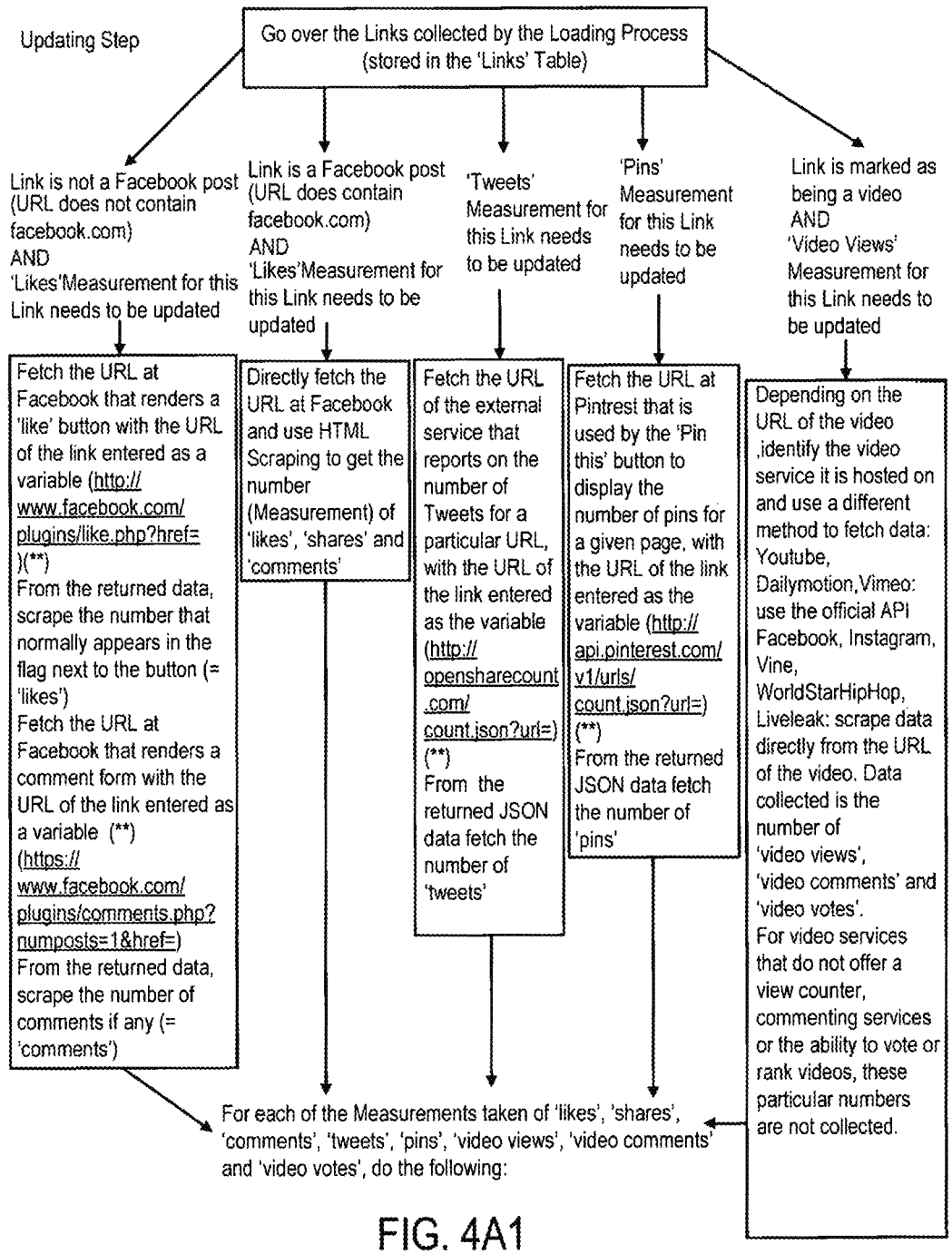
FIG. 4A1

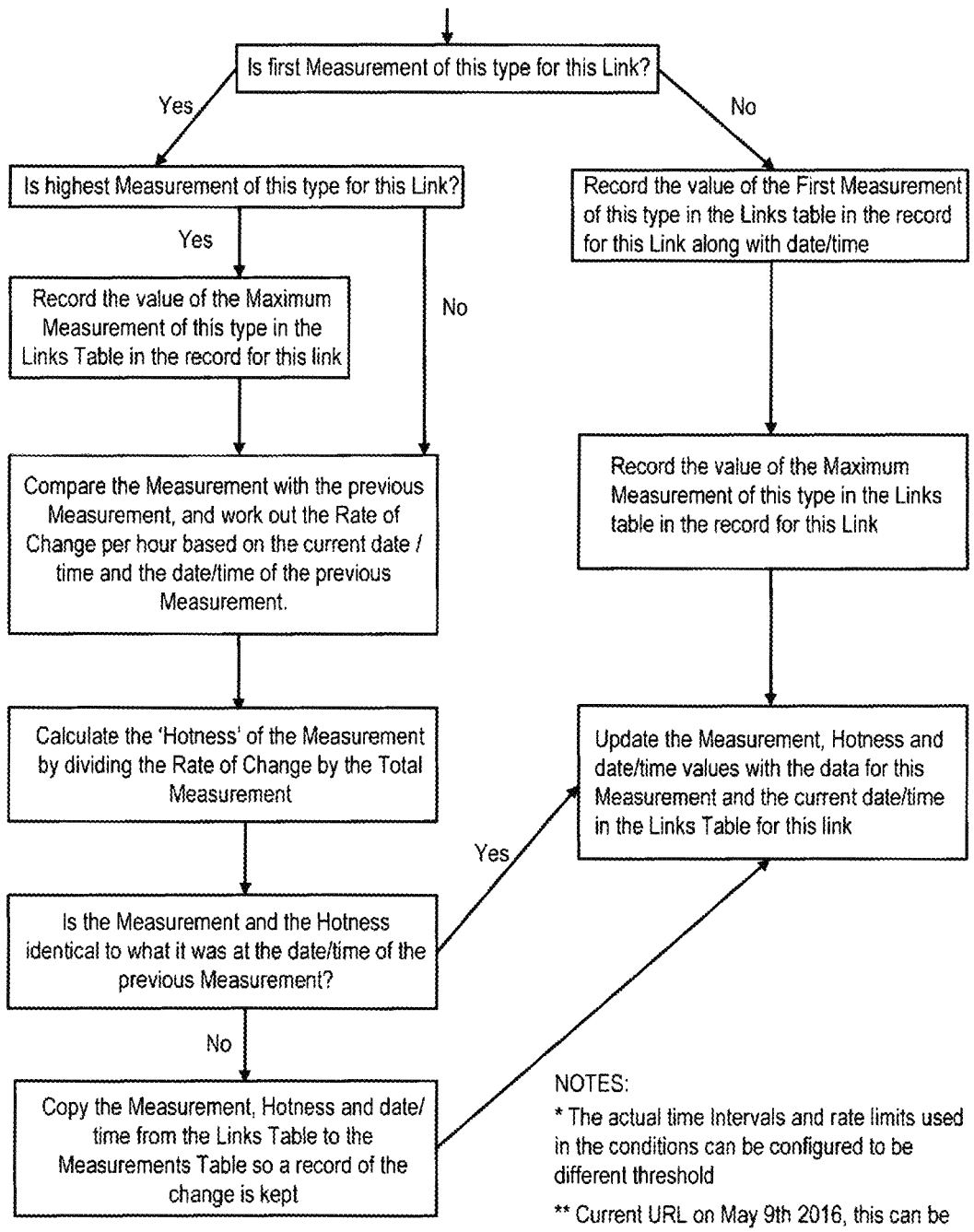
FIG. 4A2

Adding a new SET

Sources Management

Create, edit and delete Sets of Sources. Drag to reorder list.
Open Set to edit the Sources in it.

| Enter unique name | CREATE NEW |

- ( 24 ) Technology 🗑
- ( 60 ) Satirical Sites 🗑
- ( 15 ) Entertainment news 🗑
- ( 127 ) Fake news sites 🗑

FIG. 5

Adding a Source to a SET

Create new Source for: "Technology" sourceset.
Feed creation dialog

| | |
|---|---|
| Type of Source | Scraping, RSS and Facebook test |
| Autodetect ▼ | RSS feeds found for given URL |
| URL | (RSS 1.0) Slashdot |
| http://slashdot.org | |
| (if you want to visit the source in your browser, this is where you would go) | Check if given url is related to a Facebook page |
| | http://www.facebook.com/slashdot/ |
| | http://www.facebook.com/pages/Slashdot-effect/107814305908439 |
| | http://www.facebook.com/Slashdot-Internet-Caf(?)-1260627640799981/ |
| Pick type(s) of source to autodetect | http://www.facebook.com/slashdotMedia/ |
| ☑ RSS  ☐ Facebook ☑ HTML | http://www.facebook.com/pages/slashdotdashdotslashdotcom/1881432645983111 |
| | http://www.facebook.com/pages/slashdot-Media/1756935594542438 |
| [TEST URL]   [CREATE] | http://www.facebook.com/pages/slashdot-Development/160808627618110 2 |
| | http://www.facebook.com/pages/slashdot-Sites/1574886572838090 |
| | http://www.facebook.com/pages/slashdot-Media-offices/3133903687899 62 |
| | http://www.facebook.com/slashdotorg-1267620373937742/ |
| | http://www.facebook.com/slashdotDevelopment / |
| | HTML links found via HTML Scrapping for given url |
| | http://deals.slashdot.org/sales/purevpn-2-year-subscription?utm_source=slashdot& utm_medium=announcementbar&utm_campaign=purevpn-2-year-subscription |
| | http://slashdot.org/my/login/ |
| | http://twitter.com/EFF/status/728688339352592384 |
| | http://slashdot.org/index2.pl?fhfilter=graphics |

| Type of source: |
|---|
| Autodetect ▼ |
| Autodetect |
| RSS/XML/ATOM Feed |
| HTML Scraping |
| Facebook Page |
| Twitter Search |
| (Sub) Reddit |

FIG. 6

Selecting filters for Link Data to be displayed in a column on the TSM Dashboard
Edit column:"Most viewed video (now)"
Select the type of items to show in this column and how to display them.

Column name:
Most viewed video (now)

Display options:
Display ignored items anyway — No | Yes
Show only favorited items — No | Yes
Infinite scroll — Off | on
Autoreloading — Disabled ∨
Max number of items: ◁ 30

Sort results by:
rate ✕ | ∨    views_video ∨

Select what to display for each item
☑ Title         ☑ Url       ☐ Author
☐ Found        ☑ image     ☑ Wide_image
☑ Description  ☐ Graphs    ☐ Likes
☐ Tweets       ☐ Pins      ☐ Shares
☐ Comments     ☐ Votes_video ☑ Views_video
☐ Comments_video Limit to items from:
Sets: 0
Sources: 0
MANAGE FEEDS | CLEAR FEEDS Content type(s):
Images:          Omit | Inc. | Only
Videos:          Omit | Inc. | Only
Facebook posts:  Omit | Inc. | Only
Galleries:       Omit | Inc. | Only
Language:        Select ∨

Title/description contains:
🔍
URL contains:
✎
Author contains:
◀
Title/description does not contain:
▽
Found since/before n hours ago:

FIG. 7

Selecting sorting and display options for a collection of Link Data in the TSM Dashboard Edit column: "Most viewed video (now)"
Select the type of items to show in this column and how to display them.

[ rate | x | ˅ ]   [ views_video | ˅ ]   [icon]

Select what to display for each item

- ☑ Title
- ☐ Found
- ☑ Description
- ☐ Tweets
- ☐ Comments
- ☐ Comments_video

- ☑ Url
- ☑ image
- ☐ Graphs
- ☐ Pins
- ☐ Votes_video

- ☐ Author
- ☐ Wide_image
- ☐ Likes
- ☐ Shares
- ☑ Views_video

Language: [ Select | ˅ ]

Title/description contains: [        ]
🔍

URL contains: [        ]
▲

Author contains: [        ]
▲

Title/description does not contain: [        ]
▼

Found since/before n hours ago:
Since: [    ]    Before: [    ]

Advanced filters:
[ MIN(likes)=20x ]

[ MIN | ˅ ]  [ rate | x | < ]  [ likes | ˅ ]  [ value ]   [ ADD ] [ CLEAR ]
                 | rate           |
                 | maxrate        |
                 | hotness        |
                 | acc            |
                 | first          |

Use advanced filters to ... s in the column can have. Use the ADD button to add a new advanced filter. multiple advanced filter can be active at the same ...
MAX (xxxxx): —maximum allowed value for xxxxx (mn name*)
MIN (xxxxx): — minimum allowed value for xxxxx (where xxxxx in a valid column name*)

SYSTEM AND METHOD FOR MONITORING INTERNET ACTIVITY

CROSS REFERENCE TO RELATED APPLICATIONS

This application is a continuation of U.S. patent application Ser. No. 15/164,954, filed May 26, 2016 and entitled "A SYSTEM AND METHOD FOR MONITORING INTERNET ACTIVITY," which claims benefit of priority from U.S. Provisional Application No. 62/230,091 filed May 26, 2015, the discloses of which are hereby incorporated by reference in their entirety.

BACKGROUND

The internet contains a wealth of information, however it is difficult to contain, organize and sort that information that might be relevant or useful to a user. Conventional methods for presenting useful information include measuring the total amount of activity around the content on social media, however, they lack methods for quickly determining if trending content is relatively newly trending or if it has been active for a longer period of time. It is within this context that the present invention improves upon prior art systems and methods for presenting trending, or otherwise popular information to users of the internet.

SUMMARY

An innovative system and method for processing large amounts of information including a multitude of URLs (internet links) pointing to content in the form of news articles, videos, blog posts, images, galleries, Facebook posts etc. found on the internet from a multitude of sources where the content originates or from which it is redistributed, and tracking and monitoring the content based on a multitude of sorting criteria including the trending popularity and rate on various social media platforms, is disclosed. The invention uses social media buttons, scraping and API (application programming interface) calls to certain websites to get measurement information of the content over time, while collecting, analyzing and storing that info to determine information about its trending rates that is useful to a user of the method and system.

BRIEF DESCRIPTION OF THE DRAWINGS

FIGS. 4A1-4A2 are a diagram of the Updating Process Step according to the invention;

FIGS. 5-8 are various embodiments of features for setting User parameters to process Trending Data according to the invention;

FIGS. 9-14 are various embodiments of display configurations by the user dashboard according to the invention.

DETAILED DESCRIPTION

Figure 1:
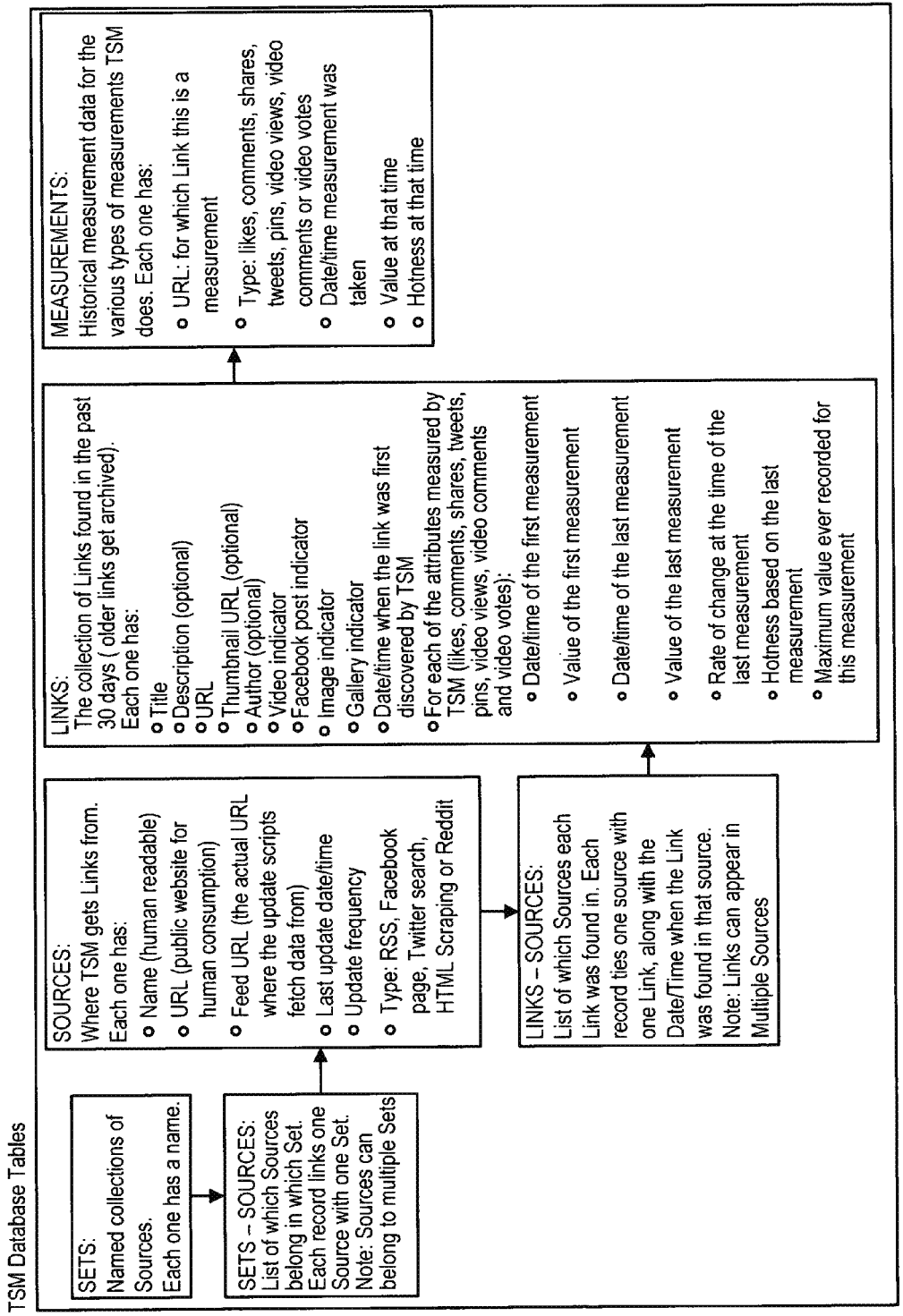
FIG. 1 is a diagram of the tables used in the system database according to the invention.

Content found on the internet is attributed to one or more Sources from which they are presented, and as identifiable by the method and system of the current invention through the internet links attributed to each Source.

The data that can be pulled from the multitude of Content Sources found on the internet is referred to as Link Data, and includes such data as the type of information, for example whether it is a news article, video, blog entry, etc., the URL, title, description, thumbnail URL, author and the language that the Content is presented in, and other information relevant to the processes of the present invention to determine its Trending Data, including its trending/popularity Rate of Change and Hotness Value, as described in the following.

The term End User refers to people who use the TSM and set parameters within the control of an administrator of the system, and an Administrator refers to a person or automation who sets the parameters for End Users of the TSM, and are referred to collectively herein as the User. It is understood that setting of parameters, and even end use of the TSM can be established for automated use such that reports, data mining and/or summary information can be collected or otherwise found to be useful as presented to the User on the systems dashboard, referred to herein as the TSM Dashboard.

The Measurement Attributes are the trending metrics relevant to Content Links collected by the TSM, including those from the following list (as collected when each individual Measurement Attribute is available):

Quantities of Likes; Shares; Comments; Tweets; Pins; Video Views; Video Comments; Video Votes; other quantifiable indicators of the popularity of a link, now existing or to be added as a feature to a current or new Source.

The Trending Data of a Link that is measured and calculated during the Updating process steps using a processor or computing system, represents the social media activity of certain intent content, and includes, but is not limited to:

First (1st) Measurement;
Current Measurement;
Date and Time "D/T" for the First and most recent Measurement values, or other point in time that may be useful to monitor the Content Measurement;
Rate of Change;
Max Rate of Change; Hotness.

The Rate of Change is calculated when storing new measurements for Measurement Attributes for a Link (quantities of likes, tweets, pins, etc.). While the First Measurement is stored permanently in the 'FIRST' column of the TSM Database for that type of Measurement Attribute of the Links Table, for subsequent measurements, the previous measurement is taken into account to calculate the rate of change per hour, which data gets stored in the 'RATE' columns. Note: if the First Measurement is less than an hour old, it is used instead of the previous measurement to calculate the rate of change, in order to have a longer sampling period. The sampling period can be made even shorter or longer by using any of the previous measurements to calculate the rate if, for example, a longer sampling period is deemed to be desirable, for example to smooth out rapid changes in a line graph representing the rate of change over time. The calculated rates are also compared to the 'MAXRATE' column, and if the latest figure is higher than the existing MAXRATE value, this field is updated to the new higher value.

The Hotness Value is the ratio between the Total Measurement and Rate of Change for an individual Measurement Attribute. After one hour of measuring, the Rate of Change is always smaller than or equal to the Total Measurement, making the Hotness value generally between 0 and 1. During the first hour of measuring the rate is extrapolated to an hourly basis based on the first and the most recent measurement so it might be higher than the total number, generating a Hotness value higher than 1 in some cases.

A marketing name for this innovation that generates relevant data concerning the trending rate and activity of the Content is the Trendolizer™, and as referenced herein as and embodiment of the invention, "TSM", the Trendolizer system, database and method is described.

The TSM stores all data it uses and collects in a database. This can be any sort of automated data storage and retrieval system that allows for the storage and retrieval of structured data, for example an SQL compliant relational database like MySQL, Oracle, MS-SQL Server or a similar system. Such systems generally require that the structure of the data is defined in a certain way (via a schema or table definition). Other database types (for example members of the NOSQL family) may not require prior definition of the data format, these can be used too as long as they are capable of storing and retrieving the TSM's data as set forth below. The detecting, sorting, monitoring, calculating and displaying steps of the present invention are executed using a computer processor or server with adequate processing power.

As illustrated in FIG. 1, there are at least six tables for data storage in the TSM Database. These six tables with a general description for each include:

Sets Table: This table holds information on the named "Sets" of Sources that the User(s) of the system have defined.

The User inputs the named collections of Sources (i.e. Sets) from which they wish the TSM to track Content. Some examples include a Set designated for American media Content, one for Belgian media Content, and another for all international political media Content. The designated Sets each form a record in the Sets Table, holding the name and an internal identifier (ID) for the set.

Sets-Sources Table: Once the User determines the Sets it wishes the TSM to track, the User then selects the Sources to track in each Set. Each Sets-Sources Table record ties an individual Source with one Set. (An individual Source can belong to multiple Sets.) In the examples set forth above, the U.S. political media website Source www.politico.com could be tied to both the "American Media" Set, and the "International Political Media" Set.

Sources Table: This table holds information on the Sources the system visits in order to find new Links. Each Source has a name, type, URL and internal identifier (ID), along with information on when the Source was last checked for new content and how frequently the Source should be checked.

During the loading phase the TSM visits the Sources designated in this table from which Links are then detected and collected and from which Link Data is pulled and added to the Links table.

Links-Sources Table: The TSM ties each Link with each Source that the Link was found in during the loading phase, along with the date and time (D/T) that the Link was found in that Source by adding a record to the Links-Sources Table. The same link can appear in multiple Sources. Records in this table hold the internal identifiers of the Link and the Source, along with the date and time when the record was added.

Links Table: The TSM stores the collection of Links and their respective Link Data in this Links Table for 30 days. Each record has the following Link Data when each piece of information is available: Internal identifier (ID), Title; Description; URL; Thumbnail URL; Author; Video Indicator; FB Post Indicator; Image Indicator;

Gallery Indicator; D/T when Link data was last updated, Language and for each of the Measurement Attributes (Likes, Views, Tweets, Pins, etc.), the Trending Data (values for measurement of the social activity of certain content, including the Rate of Change, Hotness, Maximum Rate of Change, First measurement value). During the update phase from the Link Data, Measurement Attributes are collected to compile Trending Data for each Link that later becomes available to the User through display on the TSM Dashboard.

Measurements Table: Historical records for the Trending Data of each Measurement Attribute for each Link, e.g. Internal identifier (ID) of the Link, Measurement type (Likes, Views, Tweets, Pins, etc.)+Measurement, Rate of Change and Hotness values at a particular D/T, are stored in the Measurements Table. During the update phase older Measurement Attribute data for a Link Table record is moved to the Measurements Table from the Links Table before the record in the Links Table is updated.

The following process steps for processing Trending Data in the TSM system, database and method are illustrated in FIG. 1, and detailed below.

1. User Selects Source Data for the TSM to process Trending Data and assigns these Sources to Sets.
2. Loading Link Data
3. Updating Link Data
4. Querying Link Data and Displaying Trending Data In the first process step of the database and system of the present invention, the User establishes the desired Sources from which the TSM system is to collect Content in the TSM Database and process its respective Trending Data, displayed by the TSM via the TSM Dashboard.

Figure 2:
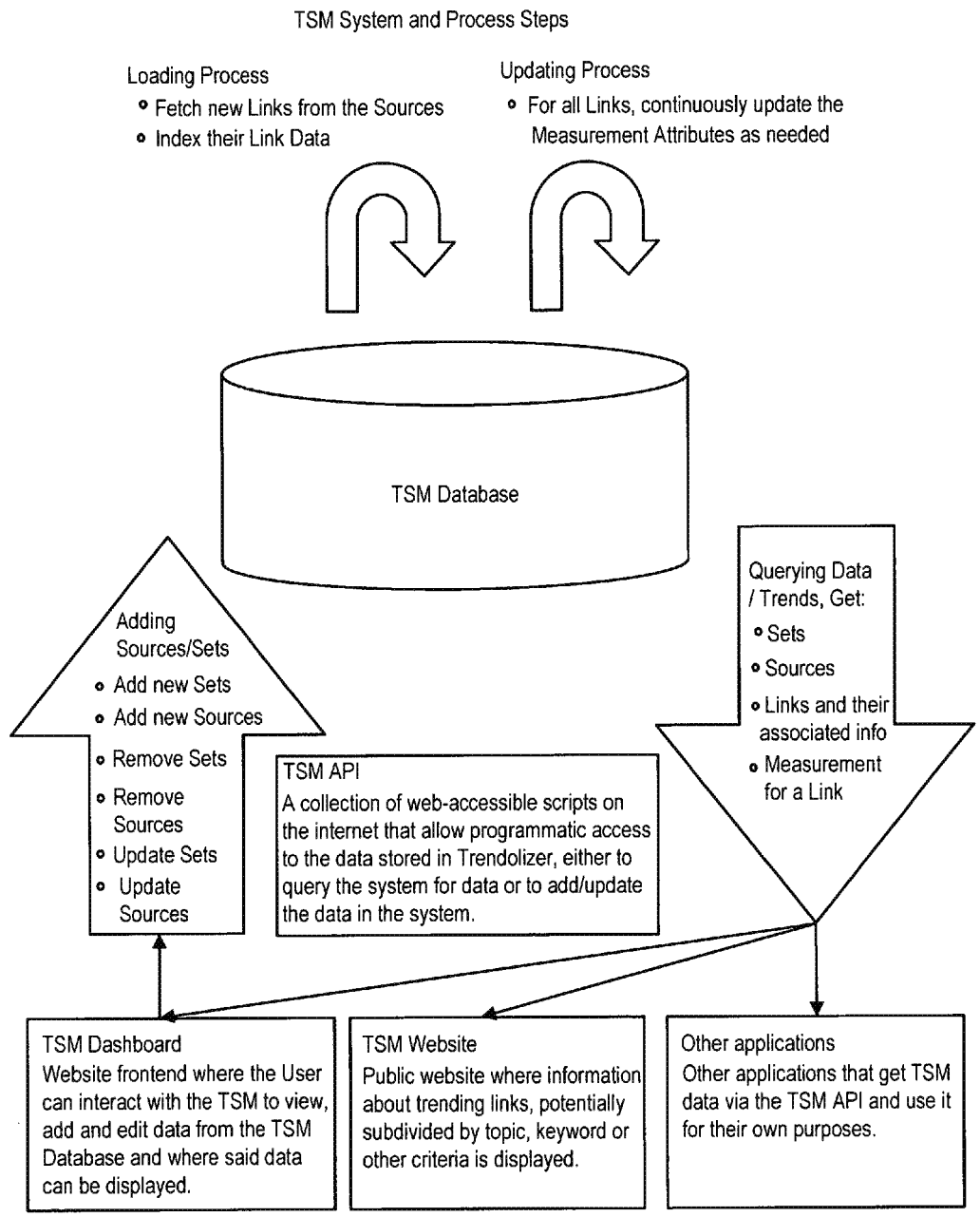
FIG. 2 is an illustration of the system and process steps, including the step for Source Data related input by a User, according to the invention.

Initial Source Data must be established before the TSM begins processing Trending Data. To do so, the User first establishes the Sources of Links for which they seek the TSM to obtain Trending Data presented by the TSM through the TSM Dashboard. First, the User selects the collections of sources (SETS) they wish the TSM to track through a prompt on the TSM Dashboard, as illustrated in FIG. 2. The TSM records those selections in the SETS Table.

Once the User determines the SETS they wish the TSM to track for Trending Data, through another prompt on the TSM Dashboard, the User then adds or selects Sources to track in each SET. Each TSM record ties each individual Source with one or more SETS as applicable, i.e. an individual Source can belong to multiple SETs. Once set, the TSM processes and then records the remaining needed items of Source Data, which is then used by the TSM for processing steps 2 through 4. The User only has to enter the Source Type, Public URL and Feed URL via the TSM Dashboard, all other Source Data values are automatically set by the system. If the User chooses to set a Language, this value is used instead of the default value.

The Source Data which is stored in the Sources Table includes:

Source Type
Name
Public URL
Feed URL

Date/Time last checked
Frequency it is checked
Language (optional)

As a demonstration of an embodiment of the TSM processing of each step, an illustration is provided.

For Process Step 1, a User, through prompts or options available on the TSM Dashboard, selects the following Sets that are placed in the Sets Table:

"Belgian Newspapers", "American Newspapers", "Websites about Politics".

Once completed, the TSM Dashboard next prompts the User to select Sources for each Set, and accordingly the User selects or adds the following Sources that are placed in the Sets-Sources Table:

For the Belgian Newspapers SET:
"De Morgen" is a Belgian newspaper
"De Standaard" is a Belgian newspaper
"Doorbraak" is a Belgian newspaper
"Doorbraak (RSS)" is a Belgian newspaper
For the American Newspapers SET:
"The New York Times" is an American newspaper
"The Washington Post" is an American newspaper
For the Websites about Politics SET:
"Politico" is a website about politics
"Doorbraak" is a website about politics
"Doorbraak (RSS)" is a website about politics
"Twitter Search for ° barna" is a website about politics
"/r/politics on reddit" is a website about politics In the second process step of an embodiment of the present invention, Link Data is loaded into the Links table of the database.

Figure 3:
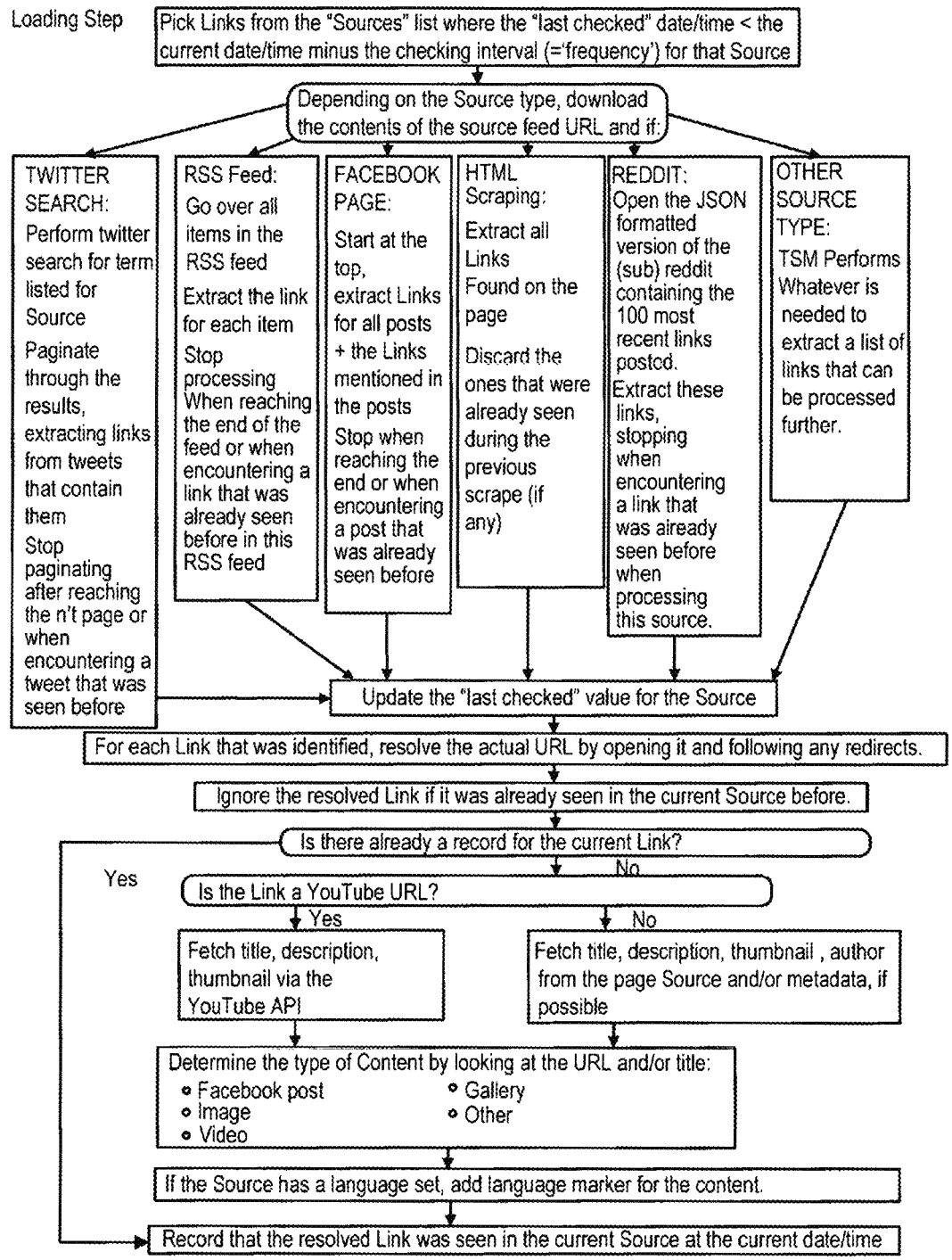
FIG. 3 is a diagram of the Loading Process Step according to the invention.

Once the Sources for each SET have been selected by the User, the TSM performs a set of algorithms on a computer processor to procure Links associated with the Sources and Link Data associated with the Links. From the Link Data, Measurement Attribute quantities can later be collected so that Trending Data may be calculated in process step 3. These steps are illustrated in FIG. 3 and described below.

A set of indexing scripts running on a server with adequate processing power continuously monitors the list of Sources that were added by the User in Step 1 and checks those where the D/T of the last check is older/longer ago than the current D/T minus the frequency. The frequency of the indexing scripts may be a default setting of the TSM, or is set by the administrator/User. For purposes of example the frequency is set for one hour in the current embodiment. Based on the number of Links found in the Source over time, the frequency gets modified according to an algorithm that monitors the Trending Data for each Link to minimize the chances of missing stories from highly productive Sources. For example, some Sources might get scanned every two hours once the default scanning time produces a lower amount of Links, while other Sources might get scanned every 15 minutes if they turn out to publish many Links.

The Load Scripts use the list of Sources to discover new Links to record in the Links Table if no existing record is present. Another record is made in the Links—Sources Table to indicate the Link was found via a particular Source at a particular D/T.

Records for Links in the Links Table contain the D/T they were first found. Once detected and inserted, each link is visited (following redirects etc.) and the Link Data-title, description, thumbnail URL and author (whatever is detectable) are extracted from the HTML and/or metadata on the page. In the preferred embodiment, Facebook's open graph tags is used to accomplish this purpose. Alternatively, the HTML, title, and <meta name="description" . . . > could also be used to accomplish this task.

During the Loading Link Data step, only Link Data is pulled from the Links discovered via the Sources that require an update, so that during the next step Measurement Attributes can be collected and tallied to calculate the relevant Trending Data. Different types of Sources are processed differently to obtain the Links.

HTML Scraping—the Feed URL is downloaded and anything that appears to be a Link is extracted for processing.

RSS—the Feed URL is treated like an RSS Feed and Links for each item in the Feed will be extracted from it.

Facebook—the Feed URL is treated like a Facebook Page, and only the Links to Facebook posts on the page, in addition to any Links shared within these Facebook Posts, are extracted.

Twitter Search—the Feed URL is a link to a search results page at Twitter. The system does this search and goes through all the pages of the returned result, scanning for Links in the returned Tweets.

Reddit—The Feed URL is interpreted as a (Sub)Reddit on Twitter, the XML, JSON or HTML version of the page with the new submission of the SubReddit is pulled and all posted Links are extracted.

For RSS and Feeds and Twitter, the process stops scanning if the current item or Tweet was already seen before in that source.

If the link appears to be from a known video site it is marked as being a video. E.g. Vimeo, Vine, YouTube, Dailymotion, LiveLeak, etc.

If the URL is a You Tube video the Link Data is pulled from the You Tube API instead of the page HTML source.

Similarly, images are marked accordingly based on the URL ending (jpg, gif, etc.) or because they are hosted on a known photo sharing site; E.g. Instagram, Flickr, etc., or if the URL title has identifying keywords for photos or videos, such as "gallery" "photos" "video" etc. or if the metadata of the page specifies that the page is a gallery.

Other relevant data can be stored in the Links Table, such as if a Link is found to be hosted on Facebook.

A Language marker is set in the Links Table if information about the language is available, for example, if the Link comes from a source that has a language set, a marker for this language is added to the field in the Links table. Otherwise, the words in the title and description of the Link are compared against the top most commonly used words from major European languages such as English, French, Dutch, Spanish, German. Alternatively, the character sets are analyzed to determine whether they are e.g. Greek, Russian, Korean, Chinese, etc. or other languages set for language detection. After these steps, if the language has not been determined, the language marker is set to "Undetected".

In the illustration presented above, the Loading Link Data Step checks the Sources listed in each SET.

"De Morgen", public url http://www.demorgen.be, type: HTML Scraping, feed url: http://www.demorgen.be
"Doorbraak", public url: http://doorbraak.be, type HTML Scraping, feed url: http://doorbraak.be/
"Doorbraak (RSS)", public url: http://doorbraak.be, type RSS, feed url: http://doorbraak.be.feedxml
"Twitter Search for #Obama'", public url: http://search.twitter.com/q=#obama, type Twitter Search, feed url: #Obama "/r/politics on reddit", public url: http://reddit.com/r/politics, type: Reddit, feed url:http://www.reddit.com/r/politics.xml?sort=new&limit=100

In this illustration, suppose "Doorbraak" publishes a story about U.S. President Obama visiting Belgium. This means the story appears on their site and on their RSS feed. A bit later, someone sends a tweet containing the link to the story and with the hashtag #Obama, and someone else posts a link to the story on the /r/politics subsection of Reddit. Let's say the story URL is http://doorbraak.be/obama-visits-belguim.html When the TSM's loader scripts run, say at 9.00 a.m., all Sources are checked to see which ones are due for an update. Suppose that it is time to check "Doorbraak" and "Doorbraak (RSS)". For the first source, the HTML code at trap http://doorbraak.be is scanned for new links, since it is a Source type for Link Data collection by HTML Scraping. One of the links that is found is "http://doorbraak.be/obama-visits-belgium.html". There is no record for this link in the system yet, so the TSM adds it to the 'Links' Table, along with other Link Data such as the title, description, author, thumbnail etc. (which is determined when a TSM script instructs the TSM to visit the URL of this link). At this time, a record is also added to the 'Links-Sources' Table, indicating the story was found at 9.00 from the Source "Doorbraak". At this point these tables look like this:

Links Table Records:
  http://doothraak.be/obania-visits-belgiurn.html, title: Obama visits Belgium, author: Joseph Riter, description: President Obama visited Brussels on May 22, 2015.
  Links-Sources Table Record is updated with:
  http://doorbraak.be/obama-visits-belgium.html html found in Source "Doorbraak" at 9.00

Based on the D/T they were last checked and the interval for which they are set to be checked, the frequency for updating may be modified. Sources that tend to update frequently would be given a higher checking frequency, for example the main page with new posts at http://www.reddit.com could end up being checked every minute since there would be new Content within that interval.

In the next process step of the present invention, the Data stored in the Links table is updated with new information.

Updating the data that has been collected in Process Step 2, is illustrated in FIG. 4 and described below.

The Measurement Attributes in the Links Table are updated continuously at the frequency determined by the TSM by systematically monitoring and collecting new Measurement Attributes data for the Links in it. Links that were found more recently get updated at a higher frequency, e.g. every five or ten minutes during the first hour after being found. After this first hour, if the Rate of Change meets a certain threshold set by the User, the updates will continue at an e.g. hourly rate, and if below the threshold, the updates will continue at a much lower rate of frequency, e.g. every six hours if the rate of change is closer to zero.

After a default period of three days (that can also be modified by the User) of first being found, only the Links that are still showing a Rate of Change for a certain Measurement Attribute at a threshold level or higher continue to be updated, while those below the threshold (not or no longer trending at a defined, default or obvious threshold rate) Links are no longer updated for that Measurement Attribute.

Each day, Links older than a month become purged from the Links Table and then placed into an Archived Links Table which enables efficiency in searching when a full text search is performed on the Links table.

When updating Measurement Attributes, different scripts running on a server are used to update each type of Measurement Attributes. Some types can be related and may be processed by the same update scripts (for example: video views, video comments, video votes). Each update script operates on a subset of the Links found in the Links Table. These subsets may overlap in some cases, for example: the Twitter and Pinterest update scripts operate on all Links, the Video update script only on Links marked as being video, the Facebook Posts update script only operates on Links marked as Facebook Posts, the Facebook update script operates on all posts not marked as Facebook Posts.

Facebook: the "Like" button script is requested from Facebook with the URL for the Link the TSM are updating filled in as the parameter. The source code of this script contains the data that is normally displayed in a little flag next to the Like button to indicate the total number of Likes, Shares and comments on this URL on Facebook so far. This number is extracted and it gets stored in the 'LIKES' field in the Links Table.

Twitter: a call is made to an external service that reports on the number of tweets containing a particular URL, for example opensharecount.com or newsharecount.com. The number gets stored in the 'TWEETS' column.

Facebook Posts: for posts made directly on Facebook, no Like button can be pulled since this is not a feature Facebook offers for its own posts, however the individual number of Likes, Shares and comments can be scraped from the HTML of the post itself. These numbers are stored in separate fields: 'LIKES', 'SHARES', 'COMMENTS'.

Pinterest: Same as for Twitter, however with the 'PIN THIS' button.

Video: First the video service is determined from the URL of the link. Different methods of extracting data are used for different services. (e.g. view count, likes, etc.)
  YouTube—API is used
  Dailymotion—API is used
  Vine, Vimeo, WorldStarHiphop, Liveleak, Instagram— webscraping is used If these or other video related sites have a comments section and/or allow e.g. upvote/downvote, starring/liking mechanisms, counts for data are also scraped and stored, along with the view count, in following fields: 'VIDEO VIEWS', 'VIDEO COMMENTS', 'VIDEO VOTES' and are included as Measurements.

The instructions that determine which Measurement Attributes get updated and for which Links in the Links Table during the Update Link Data Step include:
  If Measurement Attributes: Likes/Tweets/Pins/Video Views have not been measured yet for the link then:
    Record measurement value, D/T and First Value in respective Fields in LINKS TABLE for the measurement type.
  If previous Measurements were taken for the Link, and it falls into one of these categories:
    Link was found <1 hour ago and MA were last measured >ten minutes ago.
    Link was found <3 days ago and has a positive rate of increase for MA and this was last measured >an hour ago
    Link was found <3 days ago and MA were last measured >6 hours ago
    Rate of increase for MA is >100 and this was measured >2 hours ago Then:
Compare the Latest/Current Measurement with the Previous Measurement, and calculate Rate of Change per hour based on the current and previous D/T.
Calculate the Hotness Value of the Measurement by dividing the Rate of Change by the Total Measurement.
If the Rate of Change and Total Measurement values have changed compared to the previous measurement:
Copy the previous measurement (value, Rate of Change, D/T) to the Measurements Table.
Update the value, Rate of Change, Hotness and D/T in the Links Table.
Determine whether this is the highest Rate of Change for the Measurement so far measured for this Link.
If it is, record the value in the Max Rate of Change field in the Links Table.

When a Measurement for a Link is stored in the Links Table, the previous Measurement is checked. If the value is not identical, the old value is archived in the Measurements Table so a record is kept of the date/time when the value was different. If the value is identical (i.e. the Total Measurement is the same and the Rate of Change is zero), there is no need to archive this information as it follows logically: at some point the Rate of Change dropped to zero and this change must have been recorded in the Measurement Table. The fact that the Rate of Change is still zero at the current time implies that it has been zero at all times in between. This is done to avoid storing redundant information, i.e. if the Rate of Change and Total Measurements are zeros, we know there is no activity, but if the activity picks up again, the D/T when they were last zero can then serve as the inflection point in a graph drawn of the Measurements.

This aids in storage efficiency, to reduce the number of Measurements that need to be stored over time. For many Links where the Rate of Change and Total Measurements remain zero, the First Measurement and Last Measurement need only be stored to determine the relevant Measurement information and Trending Data.

In our illustration, the TSM is now also scanning the Source "Doorbraak (RSS)", which is an RSS Feed type of Source. So when the Feed URL is visited for this Source (http://doorbraak.be/feed.xml) it is expected that the returned data is an RSS feed, and while scanning, the "http://doorbraak.be/obama-visits-beigium.html" is discovered as a new link we have not yet seen in this particular Source. But looking at the Links Table, the TSM recognizes it is already tracking this story. So only the LINKS-Sources Table is updated, which now looks like this:
LINKS-Sources Table:
http://doorbraak.be/obama-visits-belgium.html found in "Doorbraak" at 9.00
http://doorbraak.be/obama-visits-belgium.html found in "Doorbraak (RSS)" at 9.01

Ten minutes later, when the update scripts are running again, it is time to update the "Twitter Search for '#Obama'" Source and the "/r/politics on reddit" Source. For both Sources the Feed URL is visited and the appropriate method for extracting Links is applied. "http://doorbraak.be/obama-visits-beigium.html". is found, however, once again, there already is a record for this in the Links Table, so only the LINKS-Sources Table is updated with this new information.
LINKS-Sources Table:
http://doorbraak.be/obama-visits-belgium.html found in "Doorbraak" at 9.00
http://doorbraak.be/obama-visits-belgium.html found in "Doorbraak (RSS)" at 9.01
http://doorbraak.be/obama-visits-belgium.html found in "Twitter search for '#Obama'" at 9.10
http://doorbraak.be/obama-visits-belgium.html found in "r/politics on reddit" at 9.10

In parallel, the update scripts have been going over the Links Table at set intervals. For the example, consider the part of the Update Step process concerned with the number of Likes. At 9.05 this process detects no scan for the number of likes has been made for this story yet, so one is performed, and zero 'likes' are found. Accordingly, the TSM updates the Links Table with following information for this Link (presented on multiple lines for readability):
Links Table:
url: http://doorbraak.be/obama-visits-belgium.html
Likes first measured at: 9.05
Likes measured first time: 0
Likes last measured at: 9.05
Likes: 0
Rate of Change Likes: 0
Hotness_Likes: 0
Max_Rate of Change_Likes: 0

Ten minutes later, another measurement takes place, and this one finds that there are now two 'Likes'. That means there is an increase of 2 over ten minutes, which upon conversion at the rate set in the TSM for Rate of Change calculation, equals 12 per hour. That would make the Rate of Change 12 and the Hotness (12/2) at a Value of 6. 'Likes' 2, Rate of Change 12 and Hotness 6 is different from the previous measurement (0, 0 and 0) so normally the TSM would now copy this information into the Measurements Table. However, since that earlier measurement was the first measurement we already have another copy of this info in the Links Table, under the 'FIRST' records, so the TSM does not need to make another copy of it.

The Links Table now looks like this:
Links Table:
url: http://doorbraak.be/obama-visits-belgium.html
Likes first measured at: 9.05
Likes measured first time: 0
Likes last measured at: 9.15
Likes: 2
Rate of Change_Likes: 12
Hotness_Likes: 6
Max_Rate of Change_Likes: 12

Skipping ahead a bit, in the illustration of the present embodiment, the next measurement happens at 10.15 (one hour later). There still are only 2 Likes. So the Rate of Change drops to 0, as well as the Hotness (0/2). This measurement is different from the last one, Therefore, the previous measurement is now copied into the 'Measurements' table, which now looks like this:
Measurements Table:
url http://doorbraak.be/obama-visits-belgium.html. at 9.15, 2 Likes, Rate of Change 12 (likes/hr), Hotness 6

The Links Table looks like this, after the last measurement is updated:
Links Table:
url: http://doorbraak.be/obama-visits-belgium.html
Likes first measured at: 9.05
Likes measured first time: 0
Likes last measured at: 10.15 Likes: 2
Rate_of Change Likes: 0 Hotness_Likes: 0
Max_Rate of Change_Likes: 12

Another hour later, a measurement again occurs, at which time there are still 2 Likes, thus the Rate of Change and Hotness remain 0. Now the measurement data is exactly the same as for the last measurement. Because of this the Measurements Table does not get updated, only the Links Table is updated, which now looks like this:
Links Table:
url: http://doorbraak.be/obama-visits-belgium.html
Likes first measured at: 9.05
Likes measured first time: 0 Likes last measured at: 11.15
Likes: 2
Rate of Change_Likes: 0
Hotness_Likes: 0
Max_Rate_of Change Likes: 12

One hour later, we measure again, and there now are 6 Likes. That means, compared to the previous measurement, an increase of 4 likes/hr. The Hotness value is now is 4/6=0.6666. Since the measurement is different from the last one, first we update the Measurements Table by copying the last measurement to it:
Measurements Table:
   url   http://doorbraak.be/obama-visits-belgium.html   at 9.15, 2 likes, 12 likes/hr, hotness 6
   url   http://doorbraak.be/obama-visits-beigium.html   at 11.15, 2 likes, 0 likes/hr, hotness 0
Next, the Links Table is updated:
Links Table:
url: http://doorbraak.be/obama-visits-belgium.html
Likes first measured at: 9.05
Likes measured first time: 0
Likes last measured at: 12.15
Likes: 6
Rate of Change_Likes: 4
Hotness_Likes: 0.6666
Max_Rate of Change_Likes: 12

In a subsequent process step, the data collected from query by the User is displayed through the TSM Dashboard.

At any point after a second measurement, the Trending Data can be viewed by the User in one of various formats the User may select (or preset as a system default) through the TSM Dashboard. The User can view (subsets of) the data in the Links Table, ordered and filtered according to various criteria via the TSM Dashboard. The TSM Dashboard consists of a number of HTML pages and associated Javascript and CSS files hosted on a webserver. The TSM dashboard interacts with the TSM API to obtain data to display or to alter data in the TSM Database.

Any data that can be entered into the TSM via the Dashboard or can be displayed on it can also be entered or obtained directly via the TSM API, which consists of a number of scripts on the server the TSM is running on that can be accessed via the internet and which return JSON-formatted data. This allows other applications to interact directly with the TSM and the data in it (for example: email alerts, mobile apps, automated posting to social media . . . ).

These features and applications can be featured through various websites and applications that incorporate the TSM functionality.

One example is the website www.trendolizer.com along with its various subdomains:
- By setting up various filters and sorting options, multiple thematic 'top n' lists are created and regularly regenerated.
- By comparing with the previous 'top n' list generated with the same criteria, links that are new in the 'top n' are identified.
- These links, along with their title, description and thumbnail image automatically get published on the thematic subsite associated with those criteria.

This results in an automatically updated website listing the most trending links within a certain topic.

Accordingly, User features available through the TSM Dashboard and API include, but are not limited to:
a. Establishing SETS and Sources for the Source Data used to acquire Trending Data.
b. The ability to select specific Link Data to be displayed and the order it should be sorted in, based on various criteria (the SETS or Sources it came from, keywords in title or description, the name of the author, having a URL that matches a pattern, minimum/maximum values for Measurement Attributes, Trending Data or D/T when the link was first found by the TSM . . . )
c. Once these parameters have been set, the display attributes and format of Link Data, Measurement Attributes and Trending Data can be selected. Measurement and Link-Source data can also be displayed in graphical format over a range of time.

Possible applications of the TSM Dashboard and API include, but are not limited to:
Listing the Links that are gaining the most Likes/Tweets/Pins (or other Measurement Attributes) per hour from all the Links tracked by the system;
Limiting said list to Links that were found in one or more specific Sources (or Set(s) of Sources);
Limiting such list to Links found during a certain time period, with a certain author, having certain keyword(s) in the title/description, being of a certain type (image, video, other) or a combination of such factors;
Limiting such lists to Links having a minimum or maximum number of Likes/Tweets/Pins or any of the other numbers tracked by the system (such as Hotness, First Measurement, most recent Measurement, Rate of Change, etc.).

FIGS. 5-14 illustrate various features of the TSM Dashboard available to the User to set criteria and parameters for Trending Data, in addition to some of the applications that can be displayed via the TSM Dashboard.

FIG. 5 is an example screen on the TSM Dashboard that enables the User to add a new SET in order to obtain Trending Data relevant to that SET. To create a new SET the user enters a unique name for the SET into the form field and clicks the button labeled "CREATE NEW". The SET will be added to the list in the lower part of the screen. Existing SETS are displayed along with the number of SOURCES in them. SETS can be deleted by clicking the garbage can icons next to them.

FIG. 6 is an example screen on the TSM Dashboard that enables the User to add a new Source to a SET already selected in order to obtain Trending Data relevant to that Source. The User can select the type of SOURCE he wants to add via a dropdown menu listing the available types. If the type is left to 'Autodetect' the system will try and detect the type of source based on the value entered in the 'URL' form field. After the User enters a URL in the URL form field, the 'TEST URL' button must be clicked and the system will attempt to fetch content from the SOURCE indicated by the URL. If content is detected for a type of source, it will show up in the list of sources on the right hand side of the screen. One or more SOURCES in that list can then be selected by clicking on them. Clicking the 'CREATE' button will then add these SOURCES to the SET indicated at the top of the screen.

FIG. 7 is an example screen on the TSM Dashboard that enables the User to select filtering options for displaying a column of Link Data named "Most Liked Video". User can select the type of content that should be displayed along with the attributes to be displayed for each piece of content. In addition the user can select various filters and sorting criteria.

FIG. 8 is a further example of a screen on the TSM Dashboard that enables the User to select the sort option for the Link Data to be displayed in a column, along with selecting which data to display exactly. At the bottom of the screen advanced filters can be set up to specify minimum or maximum values that measurements and related numbers for the content in the column should have.

Figure 9:
Figure 10:

FIG. 9 is an example of a display screen by the TSM Dashboard that shows the Trending Data for which the User has selected filter criteria. The figure shows part of one column containing several pieces of content, ordered by the value for rate of likes. For each piece of content in this example several attributes are displayed: title, description, thumbnail image, total number of likes, rate of likes, highest rate of likes ever observed, hotness (for the 'likes' measurement)

Figure 10A1:
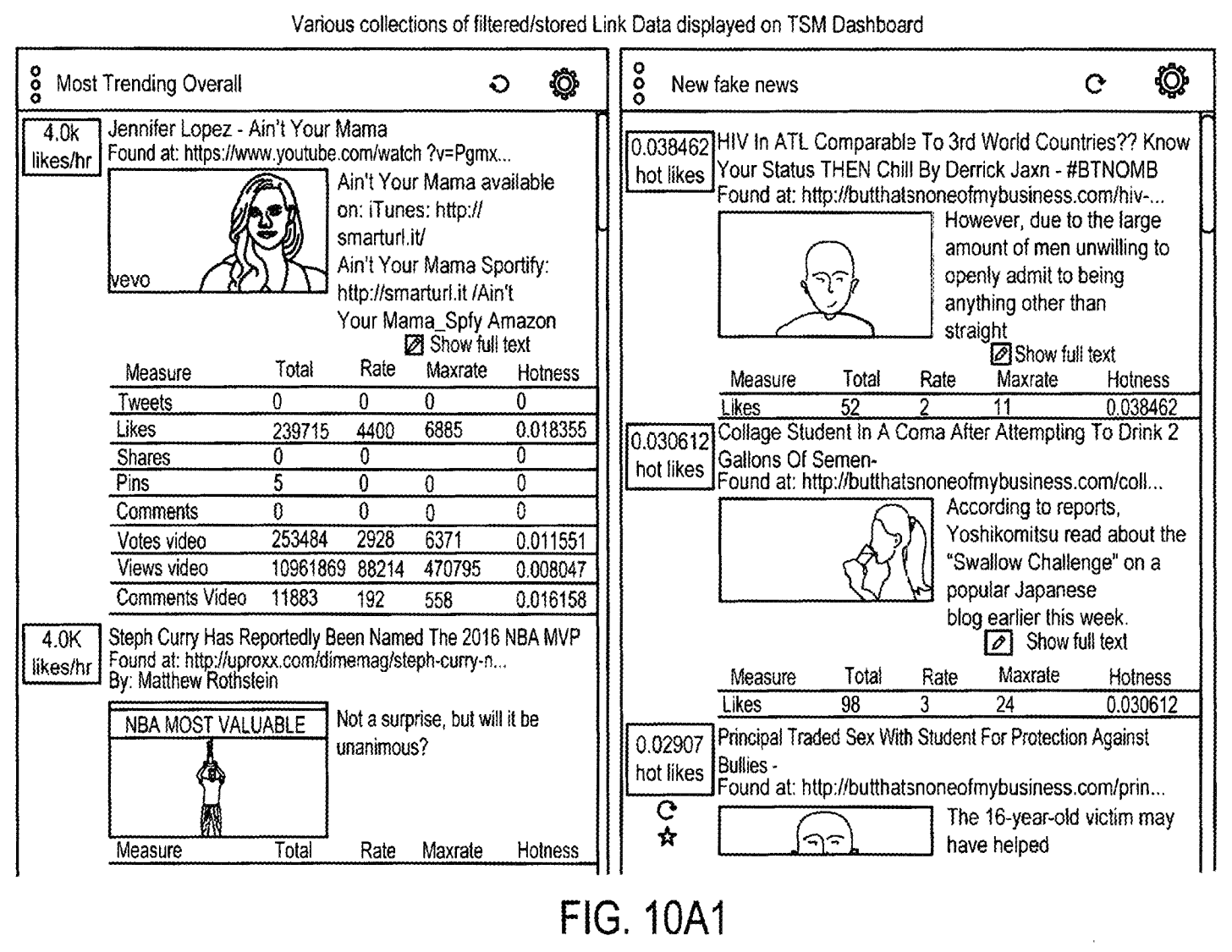

FIGS. 10A1 and 10A2 are an example of the TSM Dashboard displaying various collections of Link Data and Trending Data as presented from parameters selected by the User for such display. The figures show multiple columns containing content filtered and sorted by various different criteria and taken from various sources.

Figure 11:
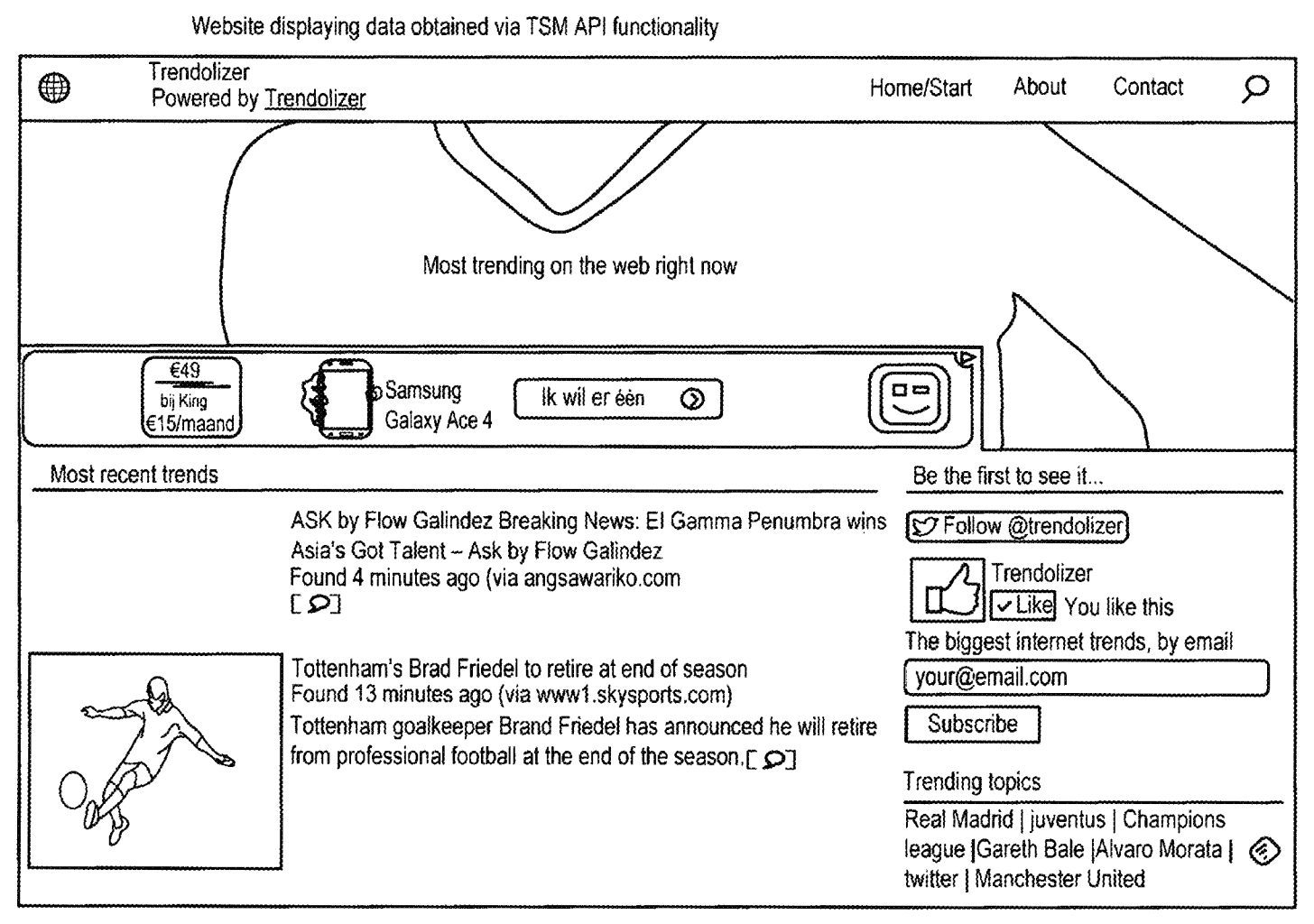

FIG. 11 is an example of a website display by a website that incorporates TSM functionality via the TSM APL The website in this example is http://www.trendolizer.com, a site that shows a chronological overview of any content that made it into the top 30 of all content available in the TSM sorted by the rate of likes in descending order.

Figure 12:

FIG. 12 is an example of a display screen by the TSM Dashboard that illustrates the Trending Data result of an exemplary Most Liked Video. It is a detail view of a single piece of content in a column with display enabled for all measurement types.

Figure 13:
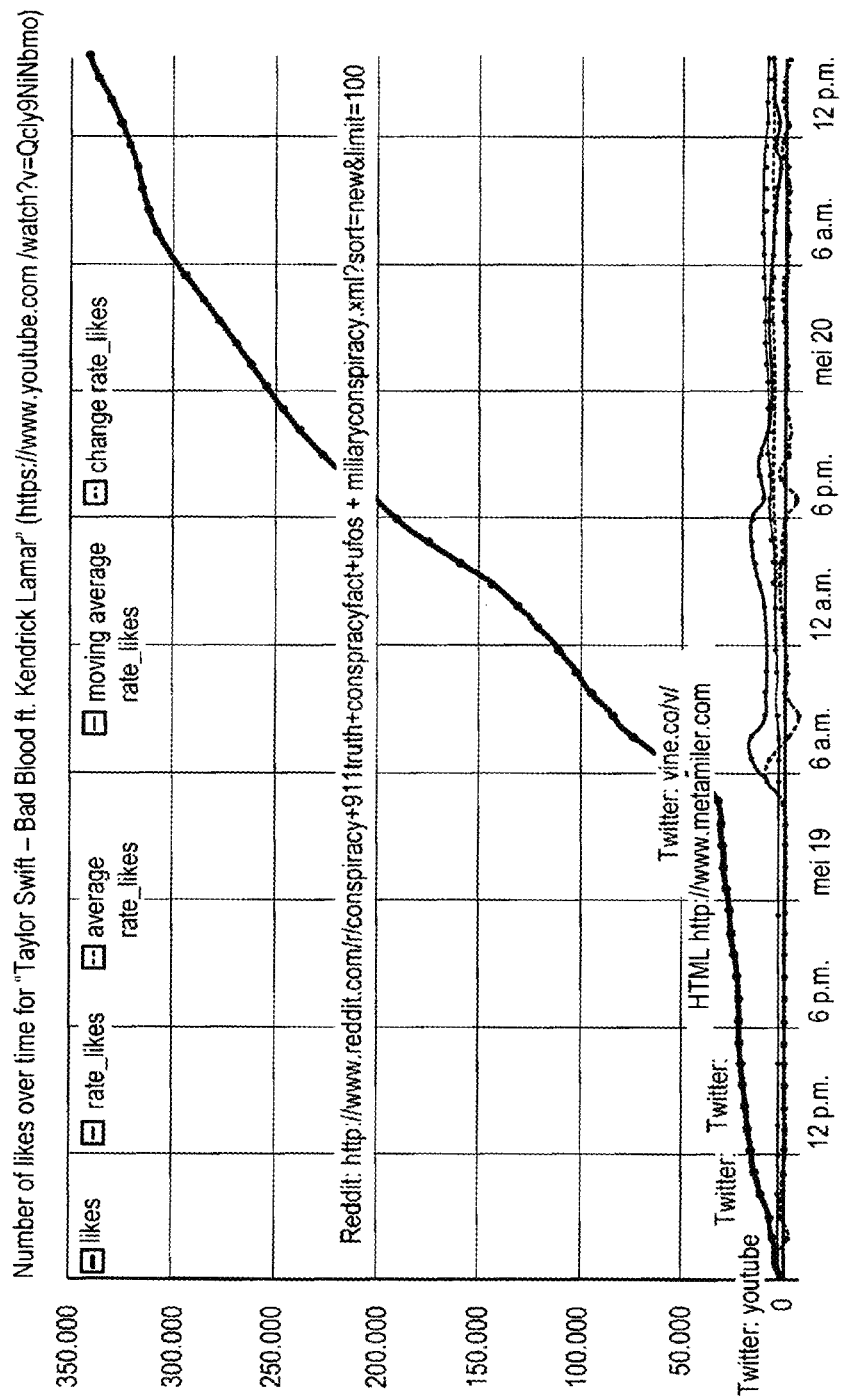

FIG. 13 is an example of a display screen by the TSM Dashboard that illustrates the Trending Data number of Likes result for a particular Video. The graph in the screen includes lines indicating the evolution over time of the total number of Likes, the rate of change, the moving average of the rate of change and the change of the rate of change. The graph also has annotations showing the time when the Video was found in individual Sources.

Figure 14:
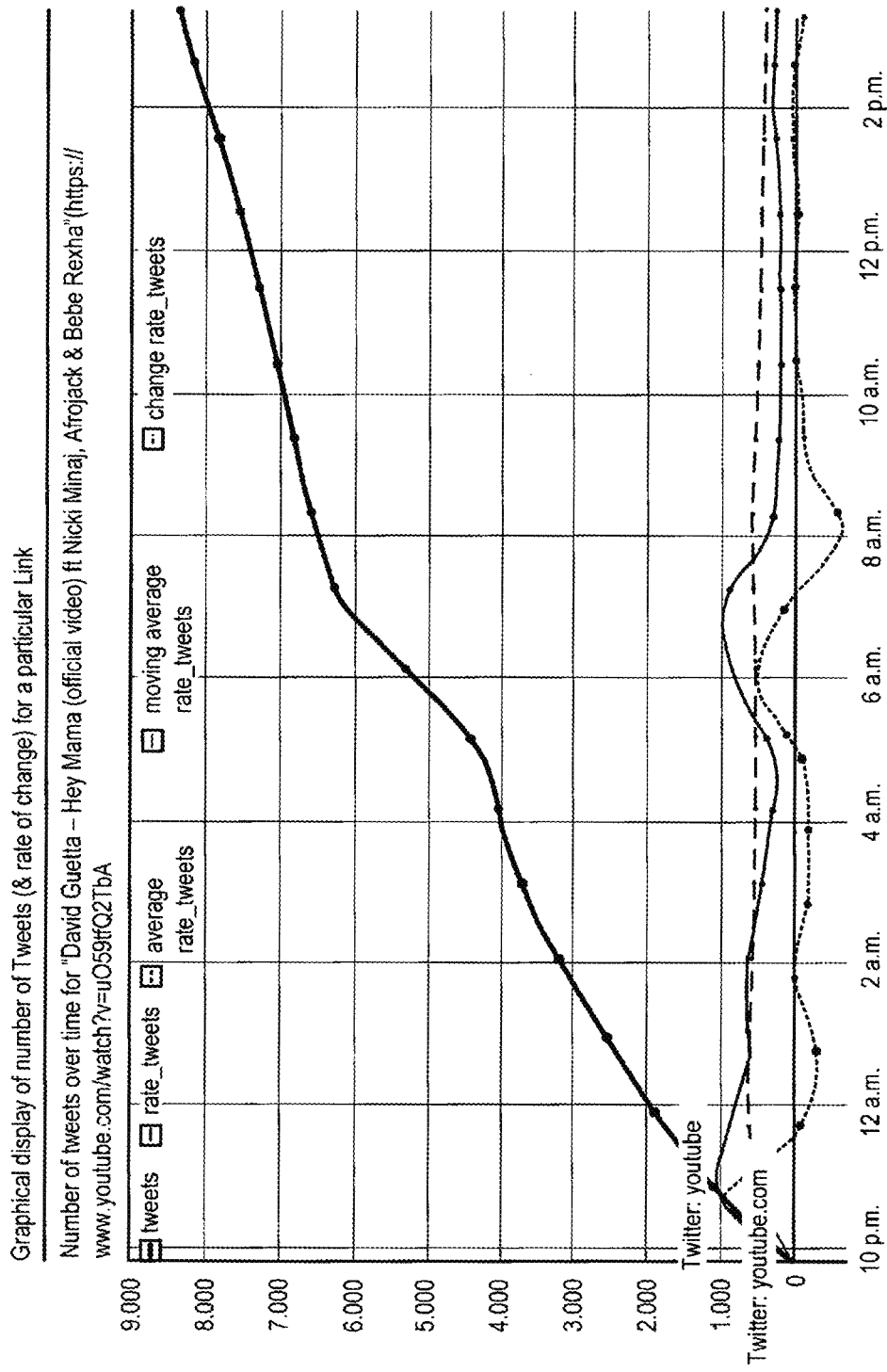

FIG. 14 is an example of a display screen by the TSM Dashboard that illustrates the Trending Data number of Tweets result for a particular Video. The graph in the screen includes lines indicating the evolution over time of the total number of Tweets, the rate of change, the moving average of the rate of change and the change of the rate of change. The graph also has annotations showing the time when the Video was found in individual Sources.

The figures and the illustrations, embodiments, examples and descriptions included in this written description are exemplary and are not intended to limit or interpret the scope or meaning of the claims. While the system and method have been described in terms of one or more of these embodiments, it is understood that alternatives to those described can be envisioned and thus incorporated by one skilled in the art, and thus are included herein. In some embodiments of the invention, the steps may occur out of the order noted in the figures. For example, two steps shown in succession may in fact be executed substantially concurrently or may sometimes be executed in the reverse order, depending upon the functionality involved.

The embodiments described herein might employ various computer implemented operations involving processors and data stored in computer systems and databases therein. The manipulations of data performed are often referred to in terms, such as producing, identifying, comparing, determining, etc. Any of the operations herein described that form part of the embodiments are useful machine operations that take placed within a computing system, from a device or apparatus for performing these operation. The apparatus can be specially constructed for the required purpose, or the apparatus can be a general purpose computer selectively activated or configured by a computer program stored in the computer. In particular, various general purpose machines can be used with processor power to execute computer programs written in accordance with the teachings herein, or it may be more convenient to construct or more specialized apparatus to perform the required operations.

An example of an implementation of the system would be a collection of scripts written in the Perl scripting language running on a server with a set of Intel processors that is running Debian Linux as its operating system, using MySQL as its underlying database, along with the Apache webserver software to make the functionality of the scripts and their output available over the internet.

The description is intended to cover various modifications and similar arrangements within the spirit and scope of the claims, the scope should be accorded the broadest interpretation so as to encompass all such modifications and similar structures.

Accordingly, the present embodiments are to be considered as illustrative and not restrictive, and the invention is not limited to the details given herein, but may be modified within the scope and equivalents of the appended claims.

What is claimed is:

1. A method for determining social media hotness activity of internet content on the internet, the method comprising:
   receiving, at one or more processors, user input parameters selecting at least one set of sources of internet content, wherein each source of internet content comprises pieces of content;
   by the one or more processors, for each piece of content,
      scraping a quantifiable indicator of a popularity of the respective piece of content from the source of the respective piece of content, and
      determining a hotness value for the respective piece of content by dividing a rate of change of the quantifiable indicator of the popularity of the respective piece of content by an activity measurement of the respective piece of content;
   generating, by the one or more processors, a representation of one or more of the pieces content having the highest hotness values; and
   transmitting, by the one or more processors a notification to an external device indicative of the generated representation of the one or more pieces of content.

2. The method of claim 1, wherein the notification is one or more of an automated email, an automated alert, an automated posting on a social media website, and an automated message via an instant messaging protocol.

3. The method of claim 1, further comprising, for each piece of content:
   measuring, by the one or more processors, the quantifiable indicator of the popularity of the respective piece of content over a range of time as activity measurements, including at least a first activity measurement and a second activity measurement occurring subsequent to the first activity measurement;
   storing the activity measurements in a database periodically over the range of time; and calculating, by the one or more processors, the rate of change of the quantifiable indicator of the popularity of the respective piece of content based on the first activity measurement and the second activity measurement, wherein the activity measurement is the second activity measurement.

4. The method of claim 3, wherein the second activity measurement is an aggregate of the first activity measurement.

5. The method of claim 1, further comprising:
periodically updating the hotness values for each piece of content based on a subsequent activity measurement for each piece of content; and
periodically transmitting an updated message based on the updated hotness values.

6. The method of claim 1, further comprising:
generating, by the one or more processors, an ordered list of the content of each source, the ordered list having an order that is based on the hotness values for the content and causing the ordered list to be displayed on a display.

7. The method of claim 6, further comprising:
generating a visualization of the generated ordered list, the visualization comprising a predetermined number of representations of pieces content having the highest hotness values.

8. The method of claim 6, further comprising:
updating the hotness values for each content based on a subsequent activity measurement for each piece of content; and generating an updated ordered list of the content based on the updated hotness values.

9. The method according to claim 1, wherein the at least one quantifiable indicator of the popularity of each respective piece of content comprises a quantity of at least one of Likes, Shares, Tweets, Pins, views, comments, or votes.

10. The method of claim 1, further comprising filtering the one or more pieces of content based on one or more of language of the internet content, a minimum social media activity measurement of the content, a maximum social media activity measurement of the internet content, or a presence of certain words from the internet content.

11. The method of claim 1, wherein the sources of the internet content comprises a source type of the internet content, a public universal resource locator (URL), and a feed URL.

12. A system for determining social media hotness activity of internet content on the internet, the system comprising:
a memory and a processor;
a database configured to store measured social media activity periodically over a range of time as activity measurements; and
a web server communicatively coupled to the database and configured to:
receive user input parameters selecting at least one set of sources of internet content, wherein each source of internet content comprises pieces of content,
for each piece of content,
scrape a quantifiable indicator of a popularity of the respective piece of content from the source of the respective piece of content, and
determine a hotness value for the respective piece of content by dividing a rate of change of the quantifiable indicator of the popularity of the respective piece of content by an activity measurement of the respective piece of content,
generate a representation of one or more of pieces content having the highest hotness values, and
transmit a notification to an external device indicative of the generated representation of the one or more pieces of content.

13. The system of claim 12, wherein the notification is one or more of an automated email, an automated alert, an automated text message, an automated posting on a social media website, and an automated message via an instant messaging protocol.

14. The system of claim 12, wherein the web server is further configured to, for each piece of content:
measure the quantifiable indicator of the popularity of the respective piece of content over a range of time as activity measurements, including at least a first activity measurement and a second activity measurement occurring subsequent to the first activity measurement, wherein the second activity measurement is an aggregate of the first activity measurement; and
calculate the rate of change of the quantifiable indicator of the popularity of the respective piece of content based on the first activity measurement and the second activity measurement, wherein the activity measurement is the second activity measurement.

15. The system of claim 12, wherein the web server is further configured to:
periodically update the hotness values for each piece of content based on a subsequent activity measurement for each piece of content; and
periodically transmit an updated notification based on the updated hotness values.

16. The system of claim 12, wherein the web server is further configured to:
generate an ordered list of the content of each source, the ordered list having an order that is based on the hotness values for the content and causing the ordered list to be displayed on a display.

17. The system of claim 16, wherein the web server is further configured to:
generate a visualization of the generated ordered list, the visualization comprising a predetermined number of representations of pieces content having the highest hotness values.

18. The system of claim 12, wherein the web server is further configured to filter the one or more pieces of content based on the user input parameters.

19. The system of claim 12, wherein the notification is transmitted to an application installed on the external device.

* * * * *